US012239046B2

(12) United States Patent
Lardieri et al.

(10) Patent No.: US 12,239,046 B2
(45) Date of Patent: Mar. 4, 2025

(54) STORAGE LOCK ASSEMBLY FOR LAWN MOWER, ZERO-TURN-RADIUS LAWN MOWER INCLUDING SAME, AND LAWN MOWER

(71) Applicant: Honda Motor Co., Ltd., Tokyo (JP)

(72) Inventors: Lawrence J. Lardieri, Greensboro, NC (US); Shota Tanabe, Chapel Hill, NC (US)

(73) Assignee: HONDA MOTOR CO., LTD., Tokyo (JP)

( * ) Notice: Subject to any disclaimer, the term of this patent is extended or adjusted under 35 U.S.C. 154(b) by 656 days.

(21) Appl. No.: 17/541,805

(22) Filed: Dec. 3, 2021

(65) Prior Publication Data
US 2023/0172103 A1 Jun. 8, 2023

(51) Int. Cl.
*A01D 34/00* (2006.01)
*A01D 34/74* (2006.01)
*A01D 34/82* (2006.01)
*A01D 101/00* (2006.01)

(52) U.S. Cl.
CPC .............. *A01D 34/82* (2013.01); *A01D 34/74* (2013.01); *A01D 2101/00* (2013.01)

(58) Field of Classification Search
CPC ...... A01D 34/82; A01D 34/74; A01D 34/824; A01D 34/661; A01D 34/64
See application file for complete search history.

(56) References Cited

U.S. PATENT DOCUMENTS

| | | | |
|---|---|---|---|
| 3,633,699 A | 1/1972 | Bishop et al. |
| 5,138,825 A | 8/1992 | Trefz et al. |
| 5,351,467 A | 10/1994 | Trefz et al. |
| 6,427,430 B1 | 8/2002 | Swartzendruber |
| 6,494,028 B2 | 12/2002 | Moore |
| 6,561,303 B2 | 5/2003 | Pierce et al. |
| 6,588,188 B2 | 7/2003 | Dennis |
| 7,013,626 B1 | 3/2006 | Strope |

(Continued)

FOREIGN PATENT DOCUMENTS

| | | |
|---|---|---|
| CA | 2392660 A1 | 1/2003 |
| JP | 5457306 B2 | 4/2014 |
| JP | 5806809 B2 | 11/2015 |

*Primary Examiner* — Thomas B Will
*Assistant Examiner* — Robert E Pezzuto
(74) *Attorney, Agent, or Firm* — KENEALY VAIDYA LLP

(57) ABSTRACT

A storage lock assembly for a lawn mower can include a primary pedal, a lock striker, a secondary pedal, and a deck lock that can be manipulated to selectively lock a mower deck into a stowed position and unlock the deck from the stowed position. The primary pedal can move the deck between a plurality of operating positions and the stowed position. The secondary pedal can include an engagement member and be pivotably attached to the primary pedal. The deck lock can be movable between a locked position where the deck lock is engaged with the lock striker, and an unlocked position where the deck lock is disengaged from the lock striker. When the deck lock is in the locked position and the secondary pedal pivots relative to the primary pedal, the engagement member can move the deck lock away from the lock striker and to the unlocked position.

20 Claims, 13 Drawing Sheets

(56) References Cited

U.S. PATENT DOCUMENTS

| | | | |
|---|---|---|---|
| 7,434,379 B2 * | 10/2008 | Nogami | A01D 34/74 |
| | | | 56/17.1 |
| 7,448,191 B2 | 11/2008 | Elhardt et al. | |
| 7,578,117 B2 | 8/2009 | Shaffer et al. | |
| 7,594,379 B2 | 9/2009 | Nicholson et al. | |
| 7,610,739 B2 | 11/2009 | Godfrey | |
| 7,861,502 B1 | 1/2011 | Benway | |
| 9,288,940 B2 | 3/2016 | Berglund | |
| 9,313,948 B2 | 4/2016 | Moriguchi et al. | |
| 9,445,543 B2 | 9/2016 | Berglund | |
| 11,856,886 B2 * | 1/2024 | Wei | A01D 34/74 |
| 2003/0094071 A1 | 5/2003 | Eavenson, Sr. et al. | |
| 2019/0116729 A1 | 4/2019 | Skoog et al. | |
| 2019/0373798 A1 | 12/2019 | Walsh et al. | |
| 2019/0387670 A1 | 12/2019 | Matsuda et al. | |
| 2019/0387676 A1 | 12/2019 | Welz et al. | |
| 2020/0022303 A1 | 1/2020 | Gindt et al. | |

* cited by examiner

STORAGE LOCK ASSEMBLY FOR LAWN MOWER, ZERO-TURN-RADIUS LAWN MOWER INCLUDING SAME, AND LAWN MOWER

BACKGROUND

The disclosed subject matter relates to a lawn mower. More particularly, the disclosed subject matter relates to an apparatus for locking and unlocking a mower deck in a stowed position.

Lawn mowers can be manually propelled, such as a push mower, or they can be self-propelled. Push mowers can rely on the force generated by an operator to move. Self-propelled lawn mowers can have a power source such as an internal combustion engine or an electric motor to move the lawn mower. Various categories of lawn mowers include walk-behind, stand-on, or riding mowers. These categories of lawn mowers can typically rely on an operator to control the direction of the lawn mower while in use. Thus, most types of lawn mowers can include a handle, levers or steering wheel that provides an operator control over the lawn mower's direction. The lawn mower can also include other control input structures such as but not limited to a blade brake lever, a travel speed lever, and a blade speed lever.

Ride-on lawn mowers can include a linkage system that suspends the cutting deck from the main frame of the lawn mower at a desired one of a plurality of different elevations with respect to a vertical direction of the lawn mower. The linkage system can include a lever or handle that the operator can move in order to adjust the elevation of the deck relative to the ground by moving a lever or handle to achieve the desired cutting height for the vegetation to be cut. The linkage system can also include a locking mechanism that can lock the deck in a stowed position that is useful for travel without cutting vegetation and for transporting the lawn mower to another location. The same lever/handle or a separate lever/handle can be manipulated by the operator to release the locking mechanism so that the operator can lower the deck from the stowed position to a desired one of the operating positions.

Ride-on mowers can include a steering wheel that pivots two wheels of the lawn mower in order to steer the lawn mower in the desired direction of travel. This type of lawn mower can be referred to as a riding mower or a garden tractor. Other ride-on lawn mowers can include a respective drive motor for each of the two drive wheels. The operator can independently vary the output of each drive motor in order to propel the lawn mower along straight path or a curved path. This type of lawn mower can be referred to as a zero-turn-radius (ZTR) lawn mower.

SUMMARY

Some embodiments are directed to a storage lock assembly for a lawn mower. The lawn mower can have a frame and a deck suspended from the frame. The deck can be adjustable between a stowed position and at least one operating position. The lock assembly can include a primary pedal, a lock striker, a secondary pedal, and a deck lock. The primary pedal can be movably mounted on the frame and connected to the deck to move the deck between the operating position and the stowed position. The lock striker can protrude from the primary pedal in a transverse direction of the lawn mower. The secondary pedal can be pivotably attached to the primary pedal and include an engagement member. The deck lock can be mounted on the frame and movable between a locked position where the deck is in the stowed position and the deck lock is engaged with the lock striker, and an unlocked position where the deck lock is disengaged from the lock striker and the deck is lowered from the stowed position to the operating position. When the deck lock is in the locked position and the secondary pedal pivots relative to the primary pedal, the engagement member can move the deck lock away from the lock striker and to the unlocked position.

Some embodiments are directed to a lawn mower that can include a main frame, a deck including a cutting chamber, a blade rotatably supported in the cutting chamber, a power source attached to the main frame and rotatably driving the blade, a plurality of wheels connected to the main frame, a linkage assembly, a primary pedal, a lock striker, a second pedal, and a deck lock. The linkage assembly can movably connect the deck to the main frame such that the deck is movable relative to the main frame between a stowed position and at least one operating position that is lower in elevation with respect the stowed position in a vertical direction of the lawn mower. The primary pedal can be movably mounted on the frame and connected to the linkage assembly to move the deck between the operating position and the stowed position. The lock striker can protrude from the primary pedal in a transverse direction of the lawn mower. The secondary pedal can be pivotably attached to the primary pedal and can include an engagement member. The deck lock can be mounted on the frame and movable between a locked position where the deck is in the stowed position and the deck lock is engaged with the lock striker, and an unlocked position where the deck lock is disengaged from the lock striker and the deck is lowered from the stowed position and the operating position. When the deck lock is in the locked position and the secondary pedal pivots relative to the primary pedal, the engagement member moves the deck lock away from the lock striker and to the unlocked position.

Some embodiments are directed to a zero-turn-radius lawn mower that can include a frame, a deck including a cutting chamber, a linkage assembly, a power source mounted on the frame, a pair of drive wheels selectively and independently driven by the power source, at least one blade rotatably supported in the cutting chamber and rotationally driven by the power source, at least one control lever, and a storage lock assembly. The linkage assembly can movably connect the deck to the main frame such that the deck is movable relative to the main frame between a stowed position and at least one operating position that is lower in elevation with respect a vertical direction of the lawn mower as compared to the stowed position. The control lever can be movably connected to the frame such that movement of the lever causes the drive assembly to drive the drives wheels in a selected one of a forward direction, a reverse direction and a turning direction. The storage lock assembly can include a primary pedal, a lock striker, a deck lock, a secondary pedal, and a pedal spring. The primary pedal can be movably mounted on the frame and connected to the linkage assembly to move the deck between the operating position and the stowed position. The lock striker can protrude from one of the primary pedal and the frame in a transverse direction of the lawn mower. The deck lock can be mounted on another one of the primary pedal and the frame. The deck lock can be movable between a locked position where the deck lock is engaged with the lock striker and an unlocked position where the deck lock is disengaged from the lock striker. The secondary pedal can be pivotably attached to the primary pedal and can include an engagement member. The pedal spring can be disposed between the primary pedal and the engagement member, and bias the second pedal is a direction away from the deck lock. When the deck lock is in the locked position and the secondary pedal pivots relative to the primary pedal, the engagement member moves the deck lock away from the lock striker and to the unlocked position.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

ZTR lawn mowers can include a steering mechanism that can include control handles, which can be used to steer the lawn mower in forward, reverse, left, and right directions. An operator of a ZTR mower can push or pull on the control handles to change the lawn mower's speed and direction. Most maneuvering controls, such as forward motion control, reverse motion control, or turning of the ZTR lawn mower can involve pushing or pulling the control handles while grasping, gripping, or controlling the control handles using both of an operator's hands. Thus, an operator's hands can be occupied when the operator also desires to manipulate other functions of the lawn mower such as but not limited to adjusting the cutting height of the deck or moving the deck into or out of the stowed position.

For example, the lawn mower can include a handle or lever that can be grasped by the operator's hand to raise and lower the deck. However, an operator may want to raise the cutting deck to the stowed position or lower the deck from the stowed position while traveling. If an operator's hands are occupied on the control handles, an operator should stop the travel of the lawn mower so that the drive control(s) can be released and the handle can be grasped to safely raise the deck into or lower the deck from the stowed position. The operator can perceive these actions as being inconvenient.

Accordingly, there is a need for a lawn mower that can include a foot pedal that can permit the operator to raise the deck to a stowed position, lock the deck in the stowed position, unlock the deck from the stowed position, and lower the deck into a desired operating position without releasing the levers for driving and steering the lawn mower.

Figure 1:
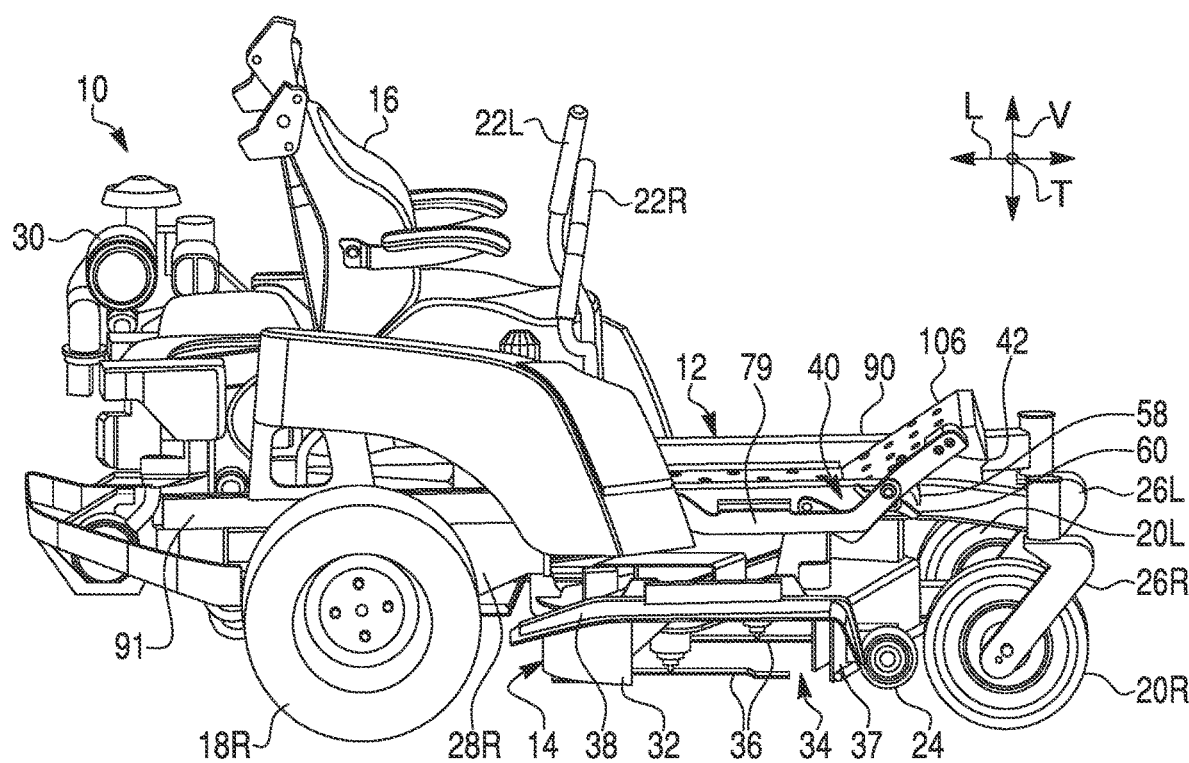
FIG. 1 is a side view of a lawn mower made in accordance with the principles of the disclosed subject matter.

FIG. 1 illustrates an embodiment of a lawn mower 10 made in accordance with principles of the disclosed subject matter. The lawn mower 10 can be referred to as a ZTR lawn mower. The lawn mower 10 can include a main frame 12, a mower deck 14 suspended from the main frame 12, and a storage lock assembly 40 that includes a lift pedal 42, a secondary, heel-actuated, unlock pedal 52, attached to the lift pedal 42, an engagement member 58 and a deck lock 60. The unlock pedal 52 is obstructed from view in FIG. 1 by the lift pedal 42, and is show in FIG. 5-13. The storage lock assembly 40 can automatically lock the deck 14 into a stowed position via the lift pedal 42, and unlock the deck 14 with the use of the unlock pedal 52. The stowed position can also be referred to as a storage position.

When an operator desires to lock the mower deck 14 in the stowed position, the operator can push the lift pedal 42 through an entire stroke. Towards the end of this action, a protruding feature on the lift pedal 42 can cam against the deck lock 60 mounted to the main frame 12, lifting the deck lock 60 out of the way and back into a locking position at the end of the stroke. FIG. 1 shows the deck 14 in the stowed position.

Then, to unlock the mower deck 14 from the stowed position, the operator can push the lift pedal 42 once more towards the end of the stroke, and at the same time with the heel of their foot, actuate the unlock pedal 52. The unlock pedal 52 can pivot on the lift pedal 42 and can include the engagement member 58. The engagement member 58 can push down on the deck lock 60, unlocking the mower deck 14. The engagement member 58 can then continue to ride along a surface of the deck lock 60 as the operator returns the lift pedal 42 back through the stroke, ensuring the deck lock 60 does not enter the path of the protruding feature on the lift pedal 42. Thus, the storage lock assembly 40 can permit the operator to stow, lock, unlock, and lower the mower deck 14 while the operator's hands are free to operate other controls and functions of the lawn mower 10. Further details of the storage lock assembly 40 will be described.

The lawn mower 10 can include a seat 16, a pair of drive wheels 18R, a pair of caster wheels 20L, 20R, a pair of control levers 22L, 22R, a plurality of wheel assemblies 24, a pair of front forks 26L, 26R, a pair of rigid plates 28R, a power source 30 and a foot plate 106. The left drive wheel and left rigid plate are obstructed from view in FIG. 1 and can be the same as or similar to the right drive wheel 18R and right rigid plate 28R. The wheel assemblies 24 can be mounted on the mower deck 14 at respective locations that are spaced about the perimeter of the mower deck 14. Only one of the wheel assemblies 24 is viewable in FIG. 1, with the remaining wheel assemblies being obstructed from view in FIG. 1.

The power source 30 can be an internal combustion engine, an electric motor or a hybrid of an internal combustion engine and an electric motor. The power source configured as an internal combustion engine or a hybrid power source can have an engine output axis oriented in the vertical direction V of the lawn mower 10.

The storage lock assembly 40 can move between a locked position in which the mower deck 14 is raised up, or stored, away from the cutting surface in the vertical direction V of the lawn mower 10 (a deck stowed position) and an unlocked position where the mower deck 14 is lowered downward in the vertical direction V toward the cutting surface (deck operating position or deck cutting position).

Referring to FIG. 1, the main frame 12 (also referred to as the frame) can support the seat 16, the control levers 22L, 22R, the power source 30 and the foot plate 106. Each of the drive wheels 18R can be connected to the main frame 12 by a respective one of the rigid plates 28R. The main frame 12 can support the front forks 26L, 26R, and the front forks 26L, 26R can rotatably support the caster wheels 20L, 20R.

The control levers 22L, 22R (also referred to as control handles) can be movably connected to the frame 12, extend away from the frame 12, and pivotable in a direction of an input force applied by an operator to control a drive direction and a steering direction of the lawn mower 10.

The mower deck 14 can be referred to as a deck, a deck assembly, a blade deck, a cutter housing, or a cutter housing assembly. The mower deck 14 can include a housing 32 that houses a plurality of blade assemblies 36. The housing 32 can include a plurality of cutting chambers 34 and a discharge opening 37 with discharge chute guard 38. The plurality of wheel assemblies 24 can engage the ground over which the lawn mower 10 traverses when the lawn mower traverse a raised portion of the surface being mowed. Each of the blade assemblies 36 can include one blade or a pair of blades rotationally offset with respect to one another. A respective one the blade assemblies 36 can be mounted within a respective one of the cutting chambers 34. The discharge chute guard 38 can be pivotally mounted to the housing 32 adjacent to and above the discharge opening 37.

Figure 2:
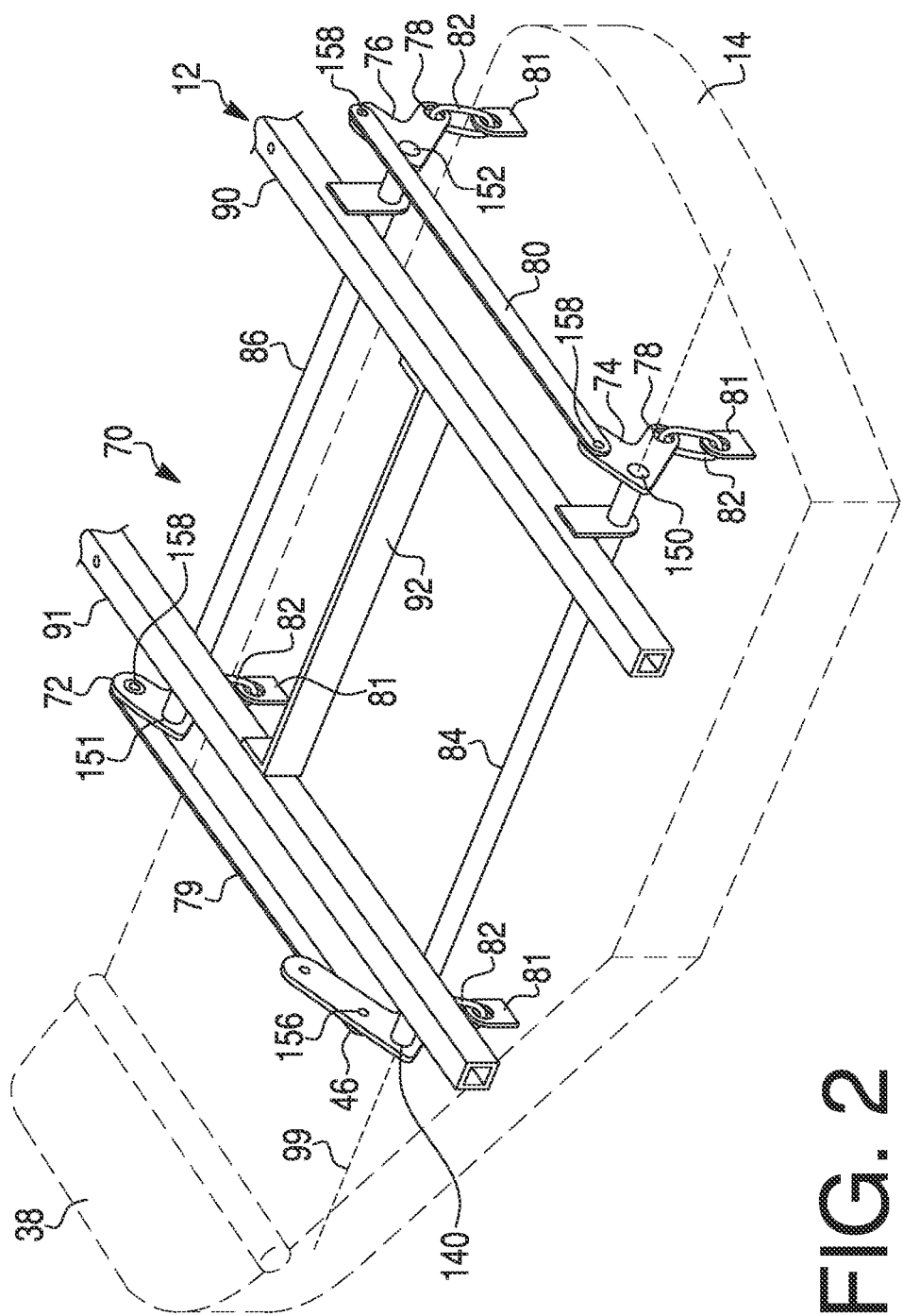
FIG. 2 is a top perspective view of a portion of the main frame, a deck in phantom, and a linkage assembly of the lawn mower of FIG. 1.

FIG. 2 is a top perspective view of a portion of the main frame 12 and a linkage assembly 70 with the remainder of the lawn mower 10 omitted for clarity and simplicity of the drawing. The deck 14 is shown in phantom. The main frame 12 can include a pair of longitudinal frame members 90, 91 (also referred to as left frame member and right frame member) and a frame cross member 92.

The frame cross member 92 can extend between the left frame member 90 and the right frame member 91. Each of the left frame member 90 and the right frame member 91 can be in the form of a cylindrical structure or tube structure, which can be square or round in cross-sectional shape, for example. Attachment portions on each end of the frame cross member 92 can be welded to a corresponding frame member 90, 91. Alternatively, each of the attachment portions can be mechanically attached to a corresponding frame member 90, 91 such as via bolts or other mechanical attachment devices or arrangements.

The linkage assembly 70 (also referred to as a plurality of linkages) can movably connect the deck 14 to the main frame 12 and can include a first lift lever 46, a second lift lever 72, a third lift lever 74, a fourth lift lever 76, a first linkage 79, a second linkage 80, a first transverse linkage 84, and a second transverse linkage 86. The lift pedal 42 can be connected to or form a part of the linkage assembly 70 allowing an operator to control the linkage assembly 70 by actuating the lift pedal 42. For example, the lift pedal 42 can include the first lift lever 46.

The first lift lever 46 can be movably mounted to the main frame 12 and connected to the deck 14. The second lift lever 72 can be movably mounted to the main frame 12 and connected to the deck 14. The first linkage 79 can connect the first lift lever 46 and the second lift lever 72. The third lift lever 74 can be movably mounted to the main frame 12 and connected to the deck 14. The fourth lift lever 76 can be movably mounted to the main frame 12 and connected to the deck 14. The second linkage 80 can connect the third lift lever 74 to the fourth lift lever 76. The first transverse linkage 84 can connect the first lift lever 46 to the third lift lever 74, and the second transverse linkage 86 can connect the second lift lever 72 to the fourth lift lever 76. Actuation of the lift pedal 42 can pivot the first lift lever 46, the second lift lever 72, the third lift lever 74, and the fourth lift lever 76.

As shown in FIG. 2, the first lift lever 46 and the third lift lever 74 can be affixed to the first transverse linkage 84, at respective attachment points 140, 150 of the first transverse linkage 84. As a result, when an operator moves the lift pedal 42, the first lift lever 42 pivots and rotates the first transverse linkage 84, which in turn, pivots the third lift lever 74. Second lift lever 72 and fourth lift lever 76 can be affixed to the second transverse linkage 86, at respective attachment points 151, 152 of the second transverse linkage 86, so as to cause the second transverse linkage 86 to rotate and, in turn, cause the fourth lift lever 76 to pivot.

Figure 3:
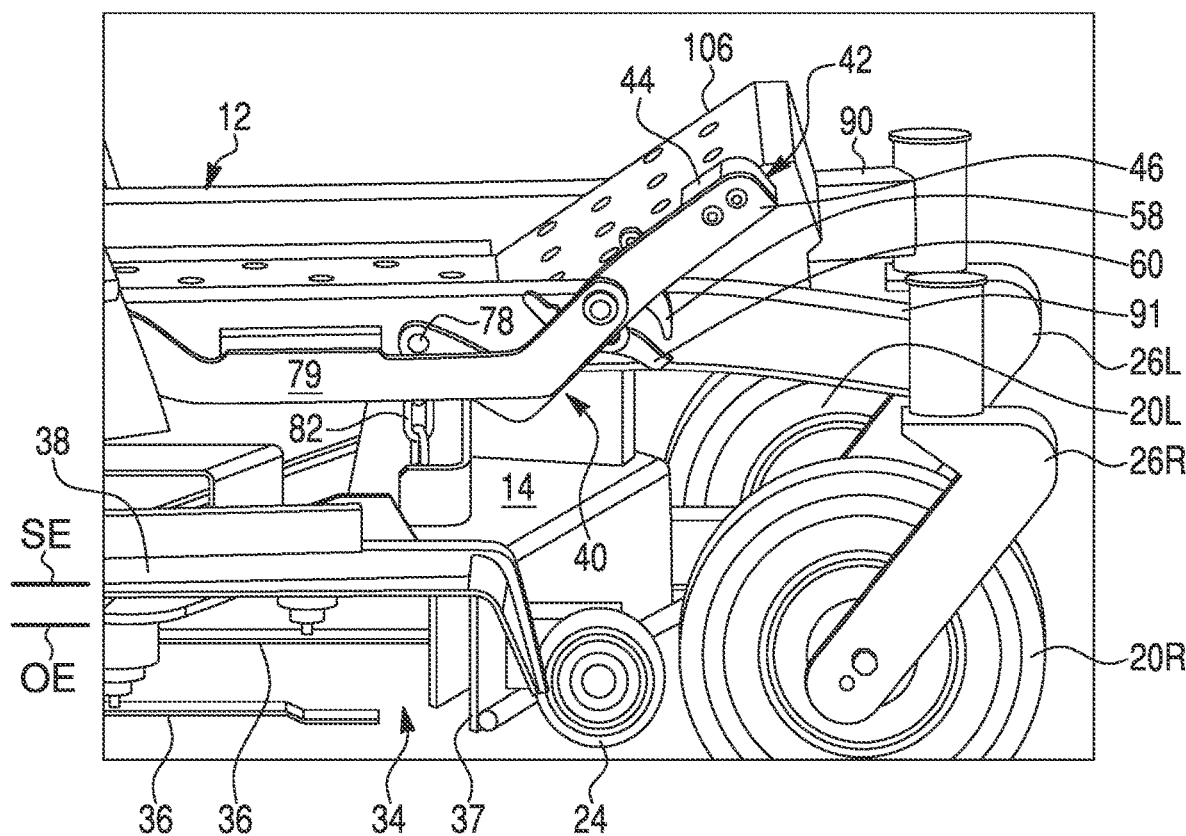
FIG. 3 is an enlarged view of a lower front portion of the lawn mower of FIG. 1.
Figure 4:
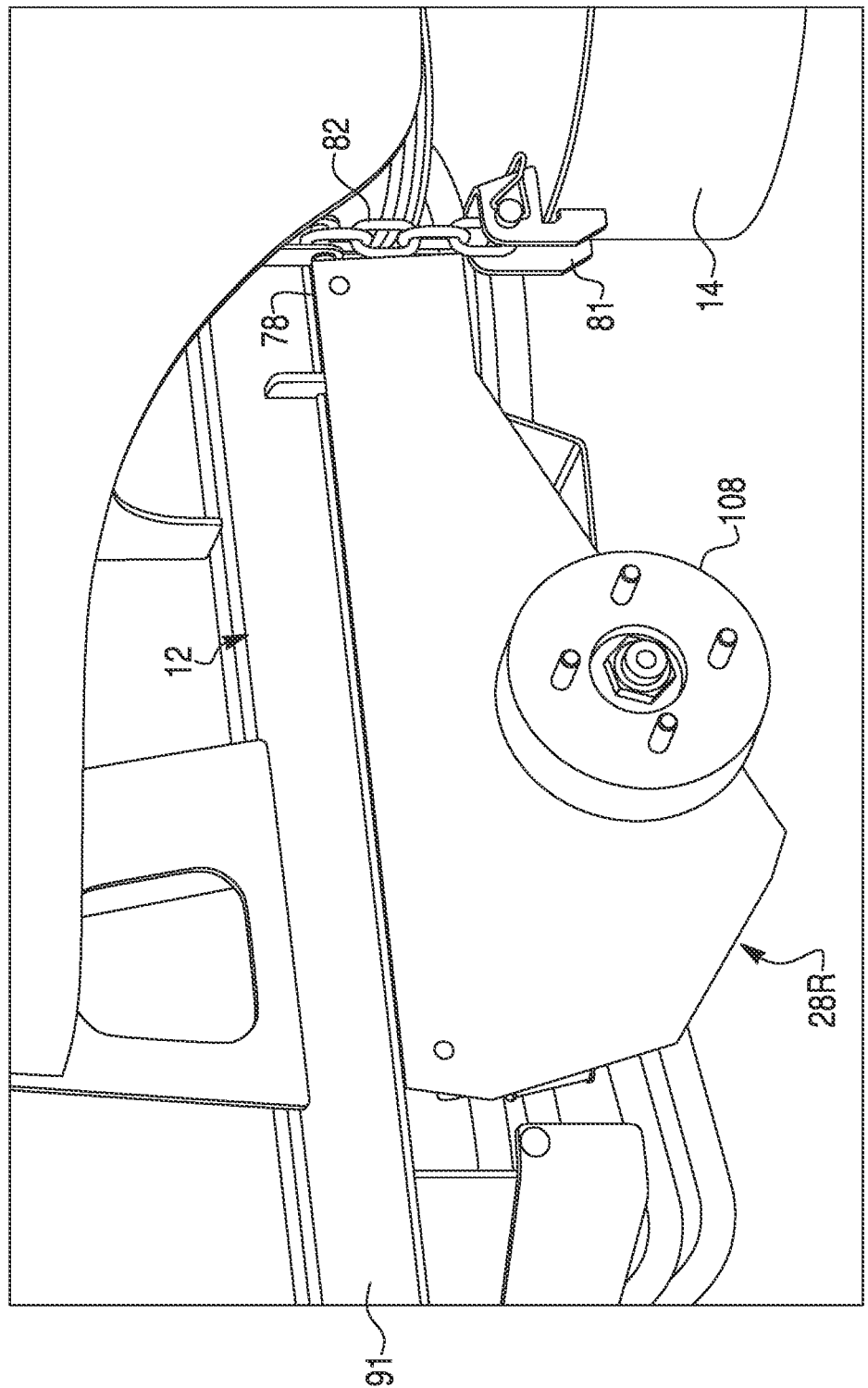
FIG. 4 is an enlarged view of a lower rear portion of the lawn mower of FIG. 1 with the rear wheel of the lawn mower removed.

Each of the lift levers 46, 72, 74, 76 can include a deck attachment element 78. The deck attachment elements 78 for the first lift lever 46 and the second lift lever 72 are obstructed from view in FIG. 2 and are illustrated in FIGS. 3 and 4, respectively. Each deck attachment element 78 can be provided to support, such as by a hanger 82, the deck 14 at varying elevations in the vertical direction V of the lawn mower 10 and relative to the frame members 90, 91, 92 or ground, and dependent on pivoting position of the lift levers 46, 72, 74, 76.

The hanger 82 can be in the form of a link, chain-link, loop, damper, or similar structure, for example. The deck 14 can include a plurality of support elements 81 that connect to a respective hanger 82. With such an arrangement, the deck 14 can be supported or suspended at a desired elevation (with respect to the vertical direction V above the lawn being cut, while still affording some flexibility in position of the deck 14 relative the frame 12 and other connected structure, including the wheels 18R, 20L, 20R of the lawn mower 10.

Figure 6:
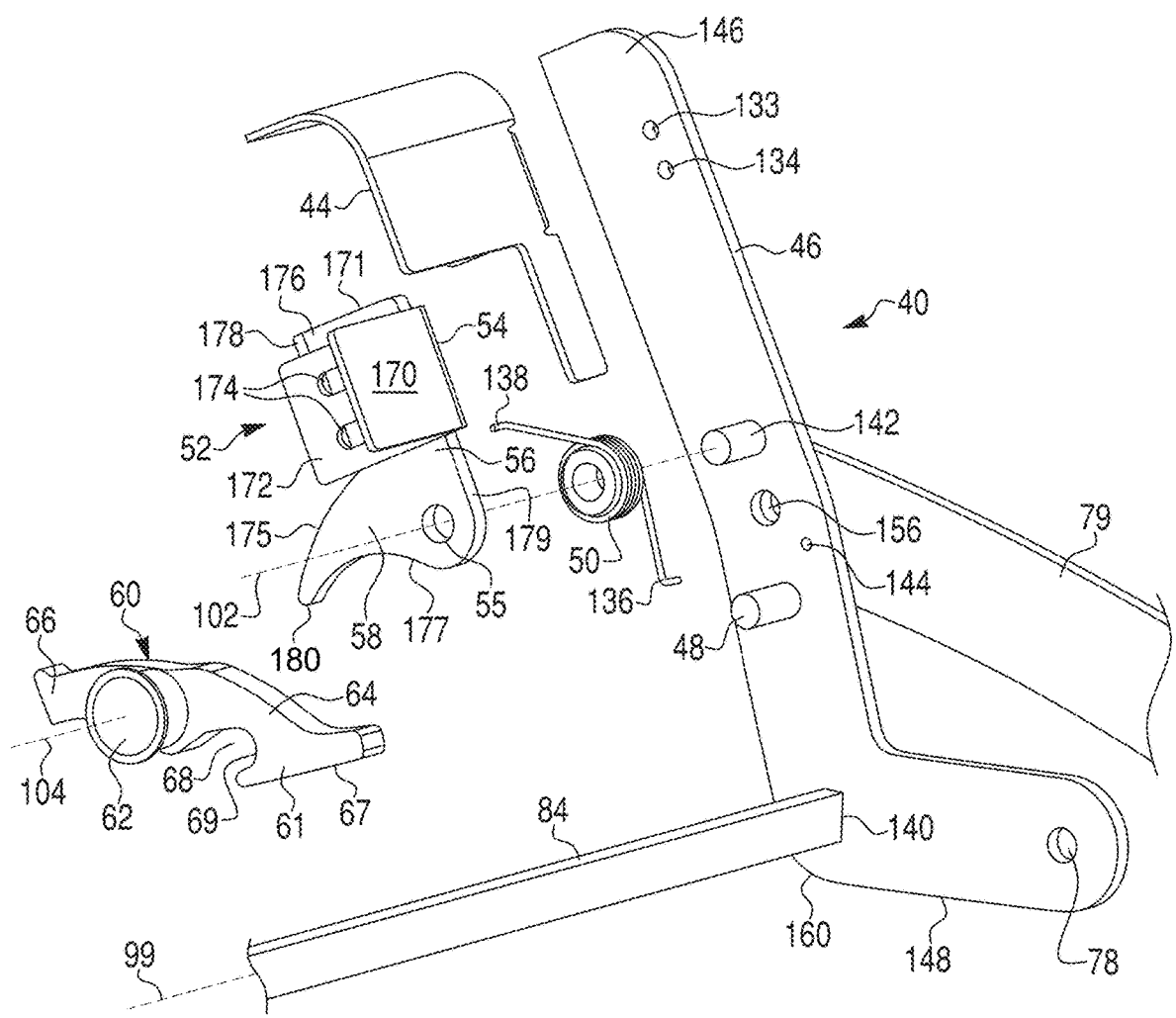
FIG. 6 is an exploded view of the storage lock assembly of FIG. 5.

FIG. 6 shows an exploded view of the storage lock assembly 40. The first lift lever 46 can include a long arm 146 and a short arm 148 that generally form an L-shape. The long arm 146 can extend from the linkage attachment point 140 to a first end of the first lift lever 46. The long arm 146 and the short arm 148 of the first lift lever 46 can be connected at an elbow 160.

Returning to FIG. 2, each of the second, third and fourth lift levers 72, 74, 76 can have a generally L-shape that includes an elbow such as the elbow 160 of the first lift lever 46. In contrast to the first lift lever 46, the second, each of the third and fourth lift levers 72, 74, 76 can include a pair of arms that are equal in length. The elbow of each of the lift levers 46, 72, 74, 76 can be connected to the respective transverse linkage respective transverse link 84, 86.

The left frame member 90 and the right frame member 91 can rotatably support the first transverse linkage 84. For example, suitable bearings or other rotational devices or arrangements can rotatably attach the first transverse linkage 84 to the left frame member 90 and to the right frame member 91. The left frame member 90 and the right frame member 91 can also rotatably support the second transverse linkage 86 in a similar manner. The first and second transverse linkages 84, 86 can be in the form of a tube, rod, shaft, or similar structure, for example.

The first transverse linkage 84 can rotate about a first pivot axis 99. Both the first lift lever 46 and the third lift lever 74 can be non-rotatably attached or affixed to opposing ends of the first transverse linkage 84. Accordingly, the first lift lever 46 and the third lift lever 74 can pivot about the first pivot axis 99 with rotation of the first transverse linkage 84 about the first pivot axis 99.

The deck attachment element 78 of each lift lever 46, 72, 74, 76 can be offset from the first pivot axis 99. As result of this offset, rotation of the first transverse linkage 84 results in a change in position of the deck attachment elements 78, of the lift levers 46, 72, 74, 76 with respect to the vertical direction V of the lawn mower. Specifically, such change in position can vary a vertical elevation of each of the deck attachment elements 78 with respect to the vertical direction V of the lawn mower 10. Due to the mechanical attachment of each of the deck attachment elements to the deck 14, such as by utilizing respective hangers 82, such variance in vertical elevation of each of the deck attachment elements can result in a change in vertical elevation of the deck 14. Accordingly, operation of the storage lock assembly 40 can be controlled so as to vary the vertical elevation of the deck 14 in the vertical direction V of the lawn mower 10.

FIG. 3 is an enlarged view of the front portion of the lawn mower 10 of FIG. 1. The deck 14 is in the stowed position in FIG. 3. The storage lock assembly 40 can be disposed outside of the right frame member 91 with respect to the transverse direction T of the lawn mower 10. The deck lock 60 and the primary pedal 42 are shown in the locked position in FIGS. 1 and 3. The first lift lever 46 can be disposed between the right frame member 91 and the first linkage 79 with respect to the transverse direction T of the lawn mower 10.

FIG. 3 shows a stowed elevation SE and an operating elevation OE of the deck 14. Any portion of the deck 14 can provide a reference point for the of the stowed elevation SE and an operating elevation OE. In FIG. 3, the discharge chute guide 38 is used as the referenced point for the stowed elevation SE and the operating elevation OE. The operating elevation OE is lower than the stowed elevation SE in the vertical direction V of the lawn mower 10. The operating elevation OE of FIG. 3 can correspond to the operating position of the deck 14 that is shown in FIG. 2. Each of the plurality of operating positions of the deck 14 can have a respective operating elevation OE that is lower than the stowed elevation SE.

FIG. 4 depicts an enlarged view of a rearward portion of FIG. 1 and shows the second lift lever 72 connected to the deck 14 with the hanger 82 attached to a support element 81 and adjacent to the right rigid plate 28R of the lawn mower 10. The right drive wheel 18R has been removed for clarity and simplicity of the drawing and can be attached to a wheel hub 108 of the right rigid plate 28R.

The lift lever 46 can raise the deck 14 in the vertical direction V of the lawn mower 10 to the stowed position and lower the deck 14 in the vertical direction V to a desired one of a plurality of operating positions. FIG. 2 shows the deck 14 in one of the operating positions. Referring to FIG. 2, the lift lever 46 can pivot about the first pivot axis 99 to raise and/or lower the deck 14 to different elevations in the vertical direction V of the lawn mower 10. The lift lever 46 can pivot and cause movement of the first linkage 79 in a front or rear longitudinal direction L of the lawn mower 10. When the operator pivots the lift pedal 42 counterclockwise (from the viewpoint of FIG. 5), the lift lever 46 rotates the first transverse linkage 84, which in turn pivots the third lift lever 74. The counterclockwise pivoting of the lift pedal 42 displaces the first and second linkages 79, 80 frontward in the longitudinal direction L, which in turn pivot the second and fourth lift levers 72, 74, respectively, thereby raising the elevation of the deck 14 in the vertical direction V of the lawnmower 10. When the lift lever 46 pivots clockwise (from the viewpoint of FIG. 5), the first and second linkages 79, 80 move rearward in the longitudinal direction L, thereby lowering the elevation of the deck 14 in the vertical direction V of the lawn mower 10.

FIGS. 5-13 are perspective views of the storage lock assembly 40 from a position that is be between the left frame member 91 and the right frame member 92. That is, FIGS. 5-13 are perspective views looking onto an inner side of the storage frame assembly 40 and FIGS. 1 and 3 are side views of an outer side of the storage lock assembly 40. The right frame member 90 is omitted from FIGS. 5-13 for clarity and simplicity of the drawings.

The deck lock 60 can include a lock attachment 62 that is secured to or a part of the right frame member 91. Although the lock attachment is shown as being exposed in FIGS. 5-13, the exposed side of the lock attachment 62 of FIGS. 5-13 abuts the right frame member 91. The deck lock 60 can be located between the right frame member 91 and the first lift lever 46 in the transverse direction T of the lawn mower 10. FIGS. 1 and 3 show the deck lock mounted on the right frame member 91.

Figure 5:
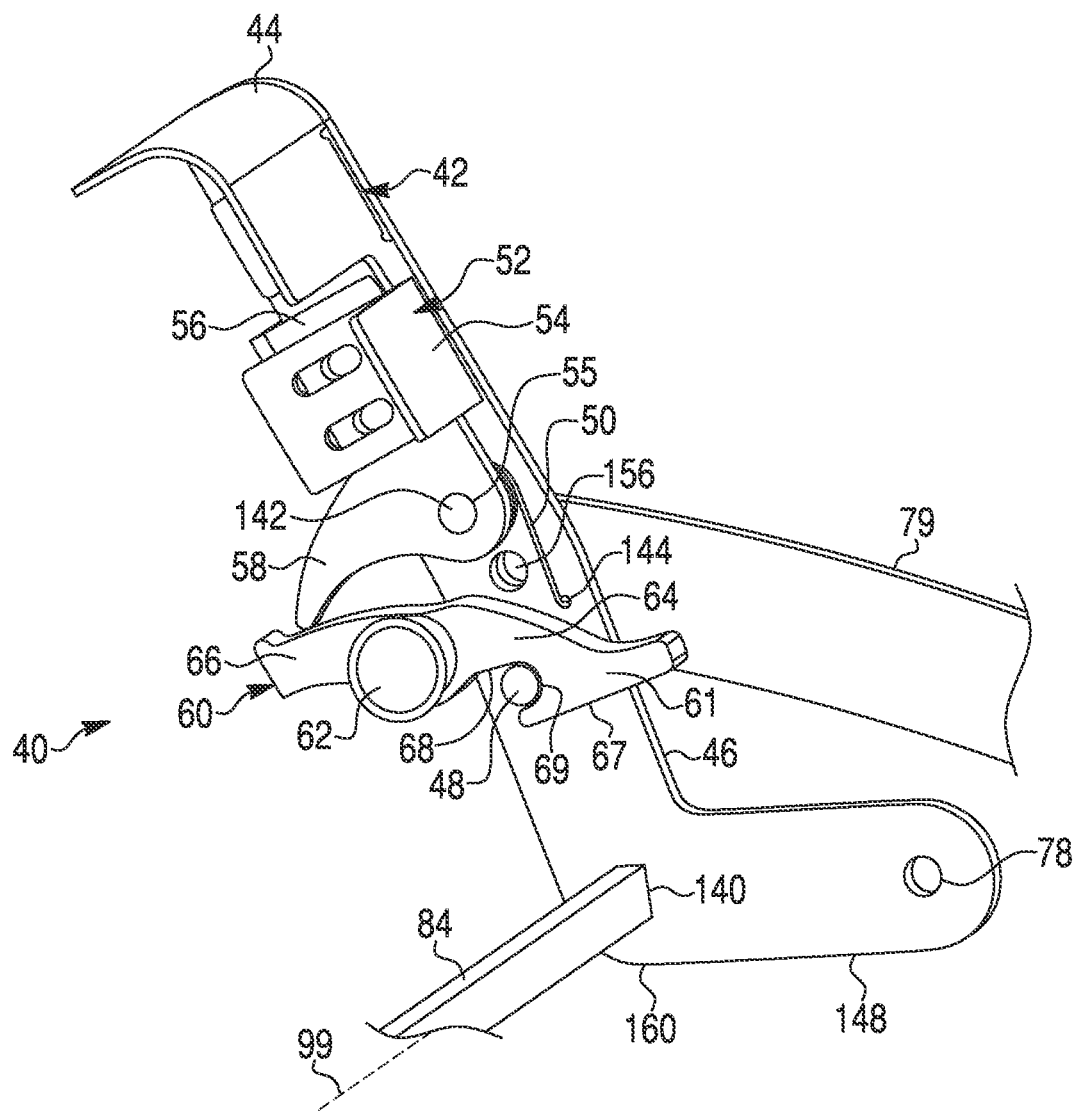
FIG. 5 is a perspective view of a storage lock assembly of the lawn mower of FIG. 1 and shows a deck lock and a primary pedal in the locked position.

The deck lock 60 can move between a locked position and an unlocked position and the lift pedal 42 can be moved between a full stroke position and an operation position. The lift pedal 42 can be in a locked position that is between the full stroke position and the operation position when the deck 14 is in the stowed position and the deck lock 60 is in the locked position. FIG. 5 shows the lock storage assembly 40 with the deck lock 60 and the lift pedal 42 in the locked position. FIG. 6 is an exploded view of the storage lock assembly 40 of FIG. 5.

The lift pedal 42 can be referred to as a primary pedal or a first pedal. Referring to FIGS. 5 and 6, the lift pedal 42 can include a primary pad 44 and the first lift lever 46. The primary pad 44 can be attached to the first lift lever 46 in any appropriate manner that fixes the primary pad 44 to the first lift lever 46. The primary pad 44 can be a rectangular shape having a square-shaped cut out on one end. On the other end of the primary pad 44, there can be a curved portion. The primary pad 44 can be any shape such that an operator can press the primary pad 44 with a foot to actuate the lift pedal 42 about a first pivot axis 99. The primary pad 44 can have any shape cut out at the lower portion of the primary pad 44 that can allow the unlock pedal 52 to pivot relative to the lift pedal 42.

The storage lock assembly 40 can include a lock striker 48, a pivot shaft 142, a spring hole 144, a pair of pad holes 133, 134 and a linkage attachment element 156 that are all located on the long arm 146 of the first lift lever 46. The short arm 148 of the lift lever 46 can include the deck attachment element 78. The linkage attachment element 156 can connect the first lift lever 46 to the first linkage 79.

Referring to FIG. 2, each of the lift levers 72, 74, 76 can include a linkage attachment element 158 connecting a respective one of the levers 72, 74, 76 to the first linkage 79 or the second linkage 80.

Returning to FIGS. 5 and 6, the lock striker 48 can protrude from the lift lever 46 in the transverse direction T of the lawn mower 10. That is, the lock striker 48 can protruded from the right side of the lawn mower 10 and toward the left side of the lawn mower 10. The lock striker 48 can have any appropriate size and shape, such as but not limited to a cylindrical peg, that can permit the deck lock 60 to firmly maintain engagement with the lock striker 48 when the lift pedal 42 and the deck lock 60 are in the locked position. The lock striker 48 can extend from the lift lever 46 a distance such that the deck lock 60 can abut or engage with the lock striker 48 when the deck lock 60 moves into the locked position.

Figure 12:
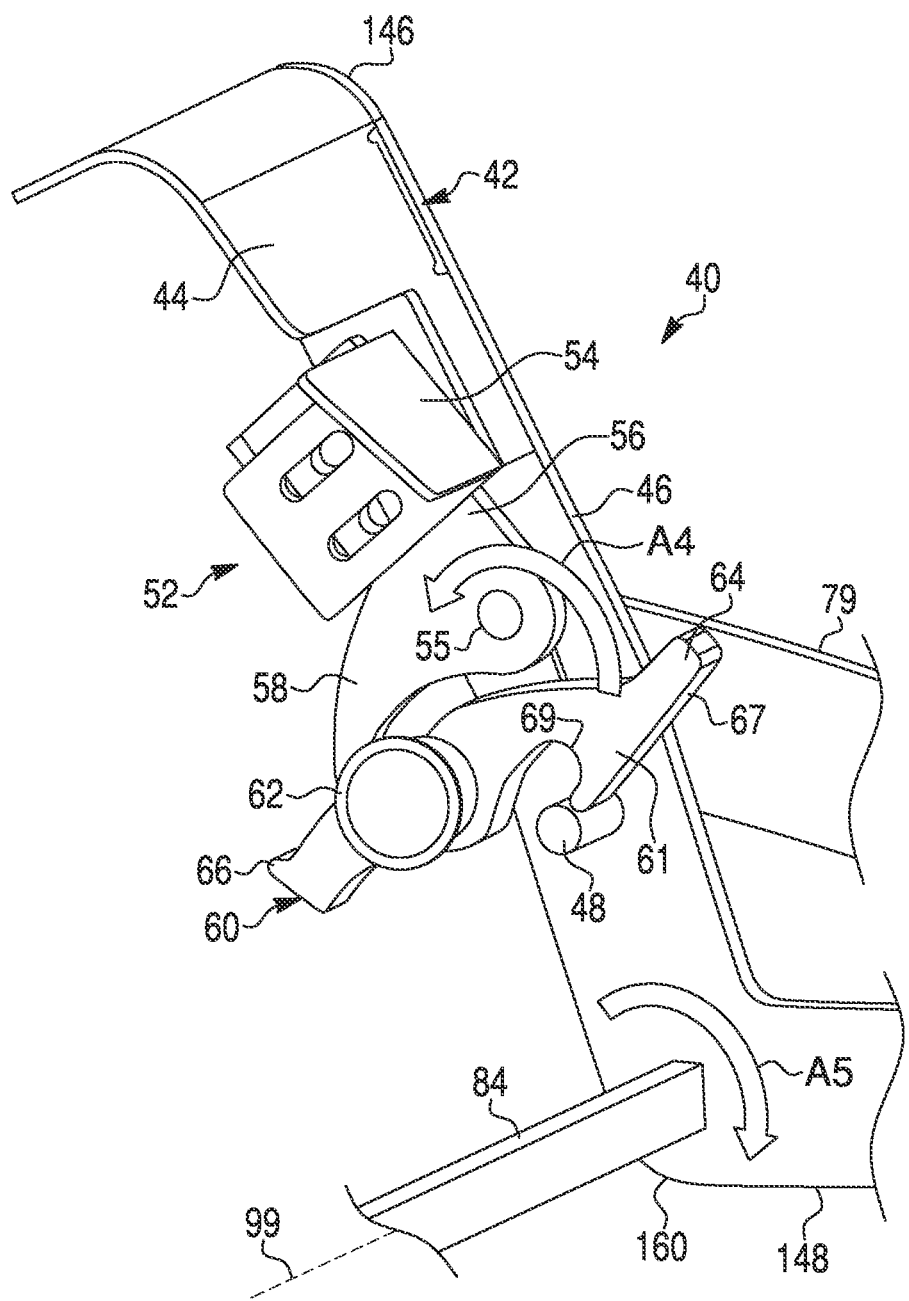
FIG. 12 is a perspective view of the storage lock assembly of FIG. 5 and shows the deck lock and the primary pedal moving into the unlocked position.

The unlock pedal 52 can pivot between a first position and a second position. FIG. 5 shows the unlock pedal 52 in the first position and FIG. 12 shows the unlock pedal 52 in the second position. The first position of the unlock pedal 52 is an unactuated state relative to the lift pedal 42. The unlock pedal 52 can be in the second position when the unlock pedal 52 is pivoted relative to the lift pedal 42 toward the front end of the lawn mower 10. From the perspective of FIG. 5, pivoting the unlock pedal 52 counterclockwise can move the unlock pedal 52 from the first position to the second position.

The storage lock assembly 40 can include a pedal spring 50 that can bias the unlock pedal 52 into the first position and away from the second position. The pedal spring 50 can be a torsional spring and can exert a bias force on the unlock pedal 52 in the clockwise direction in the viewpoint of FIGS. 5-13. The pedal spring 50 can be disposed between the lift pedal 42 and the engagement member 58 of the unlock pedal 52. The pivot shaft 142 can protrude from the lift lever 46, extend through the pedal spring 50 and into a pivot hole 55 of a main body 56 of the unlock pedal 52. The pivot shaft 142 can be a cylindrical peg extending from the lift lever 46 in the transverse direction T of the lawn mower 10. The pivot shaft 142 can support the pedal spring 50 and main body 56 of the unlock pedal 52 on the lift lever 46. The attachment between the pivot shaft 142 and the unlock pedal 52 can be any appropriate attachment such as, but not limited to, bolts, threaded fasteners, clamps, cotter pins, or other mechanical attachment devices or arrangements.

The spring hole 144 can fasten or secure a first end 136 of the pedal spring 50 to the lift lever 46. Referring to FIG. 6, a second end 138 of the pedal spring 50 can attach to the main body 56 of the unlock pedal 52 such that there is a spring bias force acting between the unlock pedal 52 and the lift lever 46 of the lift pedal 42. The spring force can bias the unlock pedal 52 toward the first position and away from the second position (in the clockwise direction from the point of view of FIG. 5). The pedal spring 50 can be mounted on the secondary mount 142 between the lift lever 46 and the main body 56 of the unlock pedal 52.

Referring to FIGS. 5 and 6, the primary pad 44 can be attached to the first lift lever 46 by any appropriate attachment including, but not limited to, screws, fasteners, bolts, rivets, welding and adhesives. For example, threaded fasteners can pass through the lift pedal 42 can be into the pair of pad holes 133, 134 in the lift lever 46.

The unlock pedal 52 (also referred to as a secondary pedal or a second pedal) can include a secondary pad 54 and the engagement member 58. The unlock pedal 52 can pivot relative to the lift pedal 42 about a second axis 102 centered on the pivot shaft 142.

The secondary pad 54 can be attached to the main body 56 and can be L-shaped having a flat side 170 that can be pressed by the heal of the operator's foot and an attachment side 172 extending away from the flat side 170 at an angle. The attachment side 172 can be perpendicular to or substantially perpendicular to the flat side 170 such that one of ordinary skill would perceive the sides 170, 172 to be perpendicular to each other.

The attachment side 172 can include elongated holes 174 that allow for different configurations of the unlock pedal 52. For example, the secondary pad 54 can be positioned closer to the operator than the primary pad 44 based on how the elongated holes 174 are oriented and fastened with respect to the main body 56. Alternatively, the secondary pad 54 can be aligned with the primary pad 44 or positioned further away from the operator than the primary pad 44 to accommodate an operator wearing heeled footwear for example. Fasteners to attach the secondary pad 54 to the main body 56 can include, but are not limited to, screws, bolts, rivets, and other mechanical fasteners.

The main body 56 can include a mounting plate 176, the pivot hole 55, and the extension 58. The main body 56 can connect to the secondary pad 54 with a fastener inserted through the elongated holes 174 of the secondary pad 54 and into the mounting plate 176 of the main body 56. An operator pushing on the secondary pad 54 can cause the main body 56 to pivot about the second pivot axis 102.

The mounting plate 176 can be a flat plate having holes for receiving the fasteners that attach the secondary pad 54 to the mounting plate 176. The mounting plate 176 can extend from the extension 58 and towards the primary pad 44 when assembled in the storage lock assembly 40. The mounting plate 176 can be disposed adjacent to the cut out of the lift pedal 42 when the storage lock assembly 40 is assembled.

The engagement member 58 can include a first end 171, a pair of curved sides 175, 177, and a pair of straight sides 178, 179 and a second end 180. The straight sides 178, 179 can be connected to and extend away from the first end 171. The first curved side 175 can be connected to and extend away from the first straight side 178 and the second curved side 177 can be connected to and extend away from the first straight side 179.

The two curved sides 175, 177 (also referred to as arcuate sides) that converge at the second end 180 to form a rounded contact surface. The radius of curvature of one of the curved sides 175 can be greater than the radius of curvature of the other curved side 177. The second curved side 177 can be concave and spaced away from the deck lock 60 when the second end 180 of the engagement member 58 contacts the deck lock 60. The shape of the engagement member 58 can allow the end 180 to rest on, cam against, slide along, and/or abut the deck lock 60 while each of the curved sides 175, 177 can be spaced away from the deck lock 60. That is, when the second end 180 is in contact with the deck lock 60, neither of the curved sides 175, 177 contacts the deck lock 60. The engagement member 58 can push the deck lock 60 to the unlocked position when the unlock pedal 52 pivots relative to the lift pedal 42 into the second position shown in FIG. 12. The engagement member 58 can slide along the outer surface of the deck lock 60 as the deck lock 60 pivots. The engagement member 58 can cause the deck lock 60 to pivot in a counterclockwise direction from the viewpoint of FIGS. 5-13 when moving the deck lock 60 from the locked position to the unlocked position.

The pivot hole 55 can be located in the main body 56 adjacent to the second curved side 177 of the engagement member 58. The pivot hole 55 can be adjacent to the pedal spring 50 and aligned with the pedal spring 50 and the pivot shaft 142. The unlock pedal 52 can rotate about the pivot shaft 142 when the unlock pedal 52 is actuated between the first and second positions. The second axis 102 can be centered through the pivot hole 55, the pedal spring 50, and the secondary mount 142.

The deck lock 60 can be mounted on the frame 12 on an outside of the right frame member 91 with respect to the transverse direction T of the lawn mower 10 and movable between a locked position that maintains the deck 14 in the stowed position and the deck lock 60 is engaged with the lock striker 48 and an unlocked position where the deck lock 60 is disengaged from the lock striker 48 and the deck 14 can be lowered from the stowed position into a desired one of a plurality of operating positions.

The lock attachment 62 can be a rotatable cylindrical structure that can limit the pivoting of the deck lock 60 between the locked position and the unlocked position. However, any appropriate rotatable attachment can be used, including but not limited to, bearings, rotary bearings, and pivotable shafts.

Figure 7:
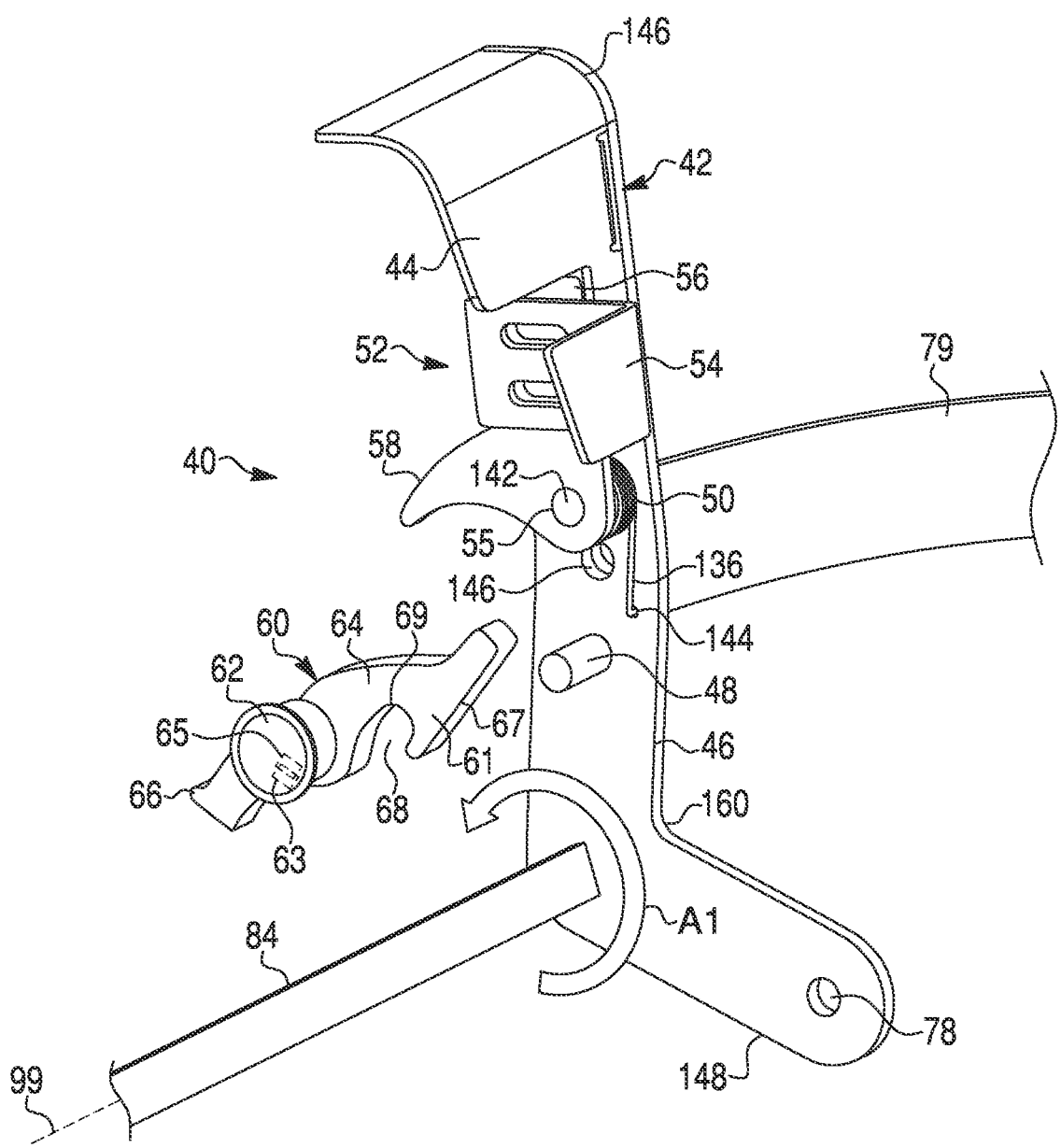
FIG. 7 is a perspective view of the storage lock assembly of FIG. 5 moving in from an unlocked position and toward a locked position.

Referring to FIG. 7, the lock attachment 62 can include a stopper 63 and the deck lock 60 can include a projection 65 that abuts the stopper 63 when the deck lock 60 is disengaged from the lock striker 48 and the lift pedal 42 is in the operation position. The stopper 63 and the projection 65 can position the deck lock 60 relative to the lock striker 48 to permit the operator to lock the deck 14 in the stowed position merely by moving the lift pedal 42 to the full stroke position and then releasing the lift pedal 42.

Returning to FIGS. 5 and 6, the deck lock 60 can pivot about a third axis 104 and relative to the lift pedal 42 and the unlock pedal 52. The third axis 104 can be centered on the lock attachment 62. The third axis 104 can be different from the first axis 99 and the second axis 102 about which that lift pedal 42 and the unlock pedal 52 respectively pivot. Further, the second axis 102 can be different from the first axis 99. When the unlock pedal 52 is actuated, unlock pedal 52 and the deck lock 60 pivot relative to each other. Further still, the unlock pedal 52 and the deck lock 60 can pivot relative to the lift pedal 42 when the unlock pedal 52 is actuated.

The deck lock 60 can include a first end 64 and a second end 66. The first end 64 of the deck lock 60 can include an elongated portion 61, a contact surface 67 extending along the elongated portion 61, and a slot 68 extending along and away from the elongated portion 61. The slot 68 can be formed such that the lock striker 48 can fit into the slot 68 and secure the deck lock 60 to the lock striker 48. The second end 66 of the deck lock 60 can be shorter in length from the lock attachment 62 than the first end 64 is from the lock attachment 62.

Figure 8:
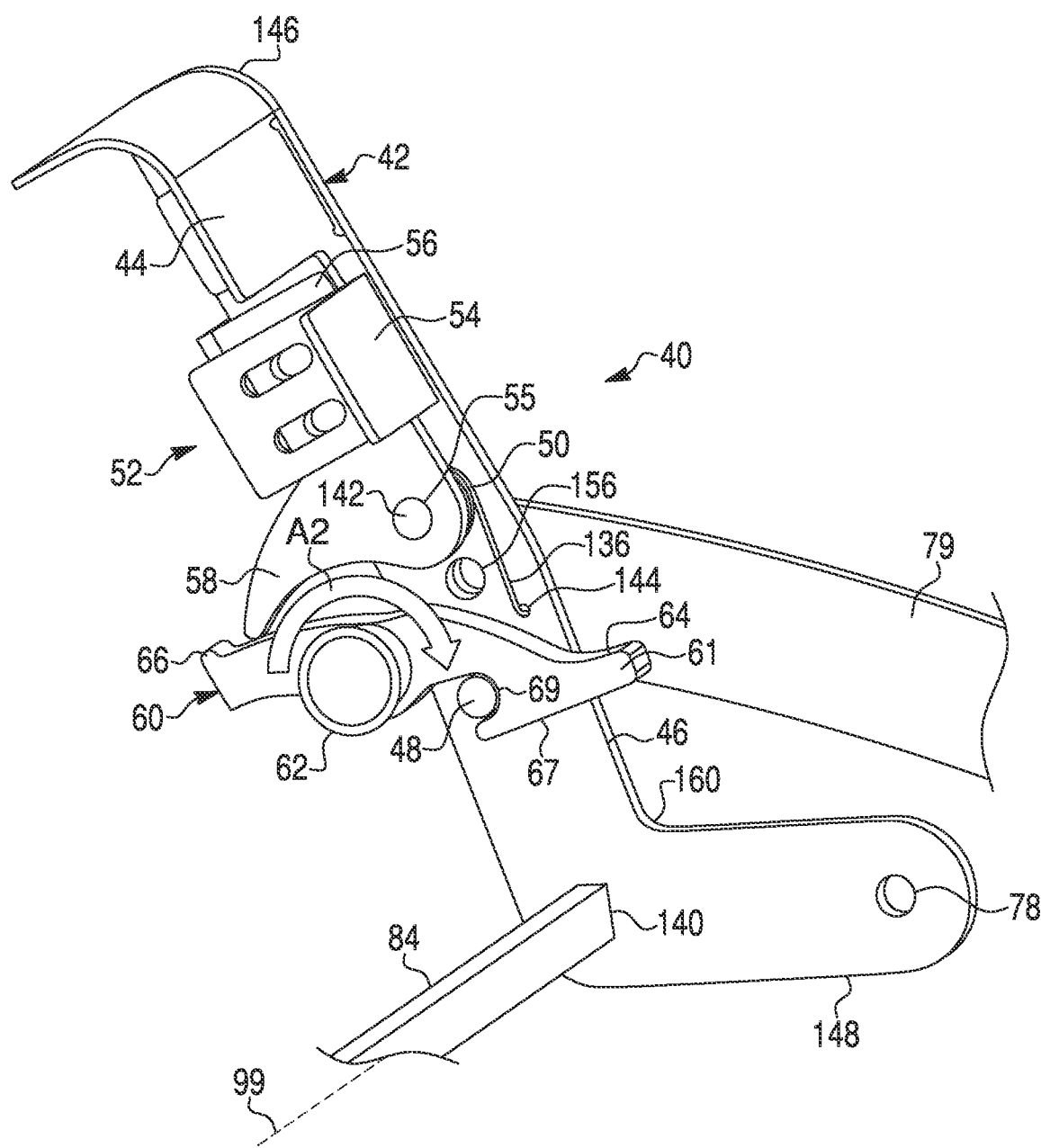
FIG. 8 is a perspective view of the storage lock assembly of FIG. 5 showing the deck lock and the primary pedal moving into the locked position.
Figure 9:
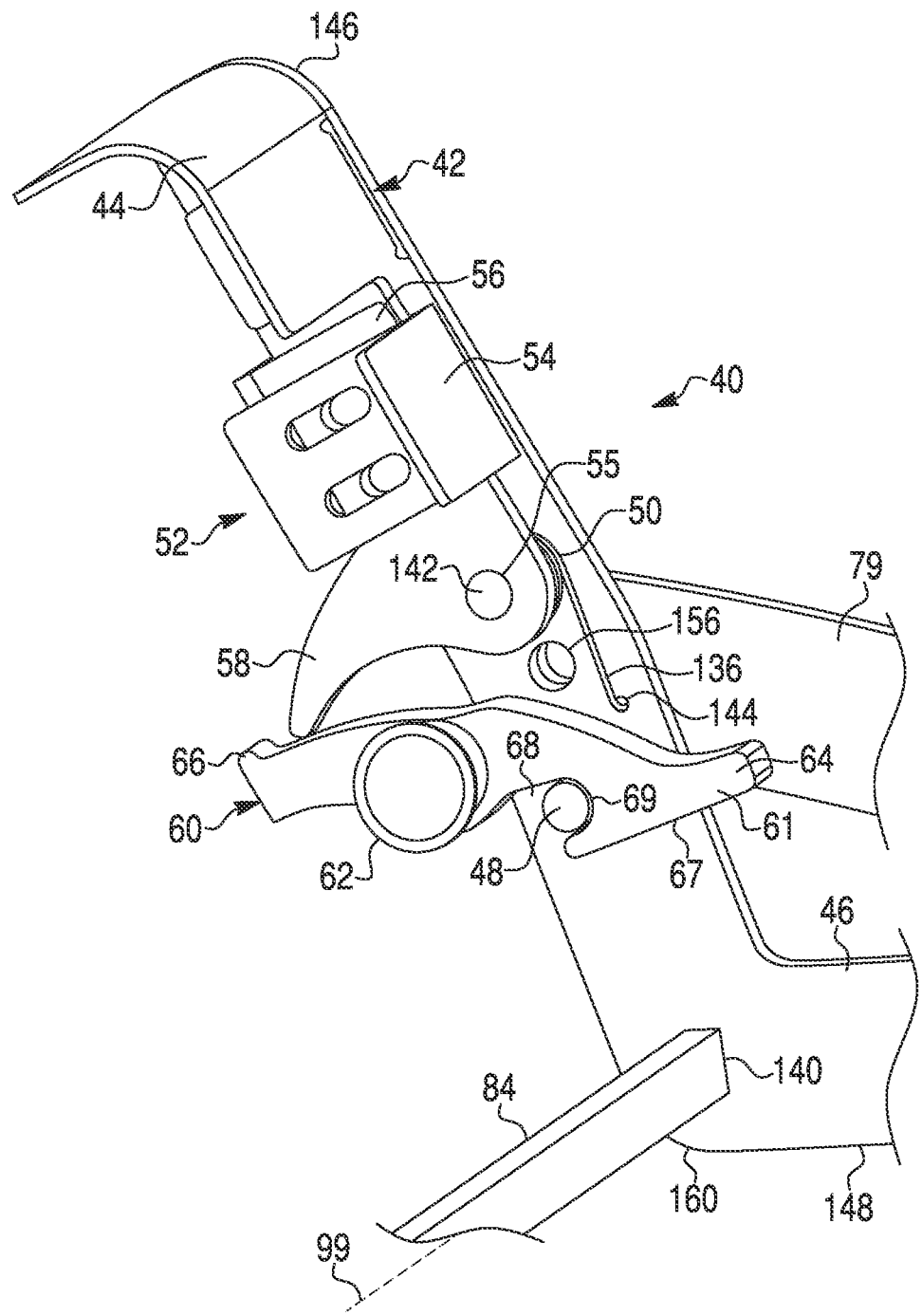
FIG. 9 is a perspective view of the storage lock assembly of FIG. 5 and shows the primary pedal and the deck lock in the locked position.
Figure 10:
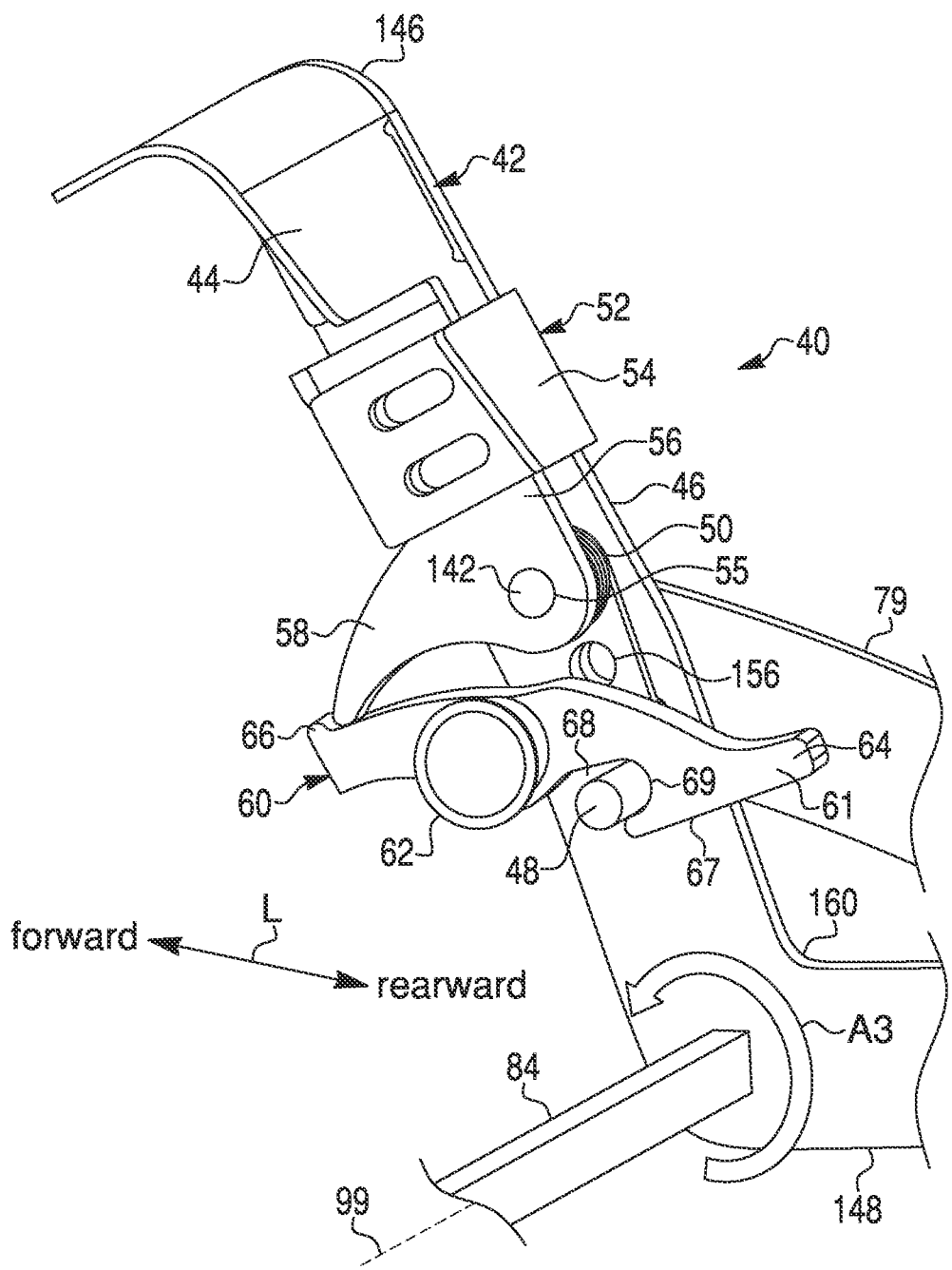
FIG. 10 is a perspective view of the storage lock assembly of FIG. 5 and shows the primary pedal moving from the locked position to a full stroke position and a lock striker moving away from the deck lock.

FIGS. 7-10 depict the storage lock assembly 40 moving from an operating position of the lift pedal 42 and the unlocked position of the deck lock 60 and into locked position of the deck lift pedal 42 and the deck lock 60. FIG. 7 shows the deck lock 60 in a locked position and the lift pedal 42 in an operating position. FIGS. 8 and 9 show the deck lock 60 and the lift lever 42 in the locked position. FIG. 10 shows the lift lever 42 in a full stroke position and the deck lock 60 in an intermediate position. The locked position of the lift pedal 42 can be between the full stroke position and the operation position and closer to the full stroke position than to the operation position. The intermediate position of the deck lock 60 can be between the unlocked position and the locked position.

FIG. 7 shows the lift pedal 42 in an operating position and the deck lock 60 in the unlocked position. When the lift pedal 42 is in the operating position, the deck 14 is suspended from the hanger attachments 82, the deck lock 60 is disengaged and spaced away from the lock striker 48, and the unlock pedal 52 is in the first position. Then, an operator can push the lift pedal 42 through an entire stroke in the direction of the first arrow A1 to reach the full stroke position shown in FIG. 10. That is, the operator can press the primary pad 44 of the lift pedal 42 to pivot the lift lever 46 counterclockwise in the frame of reference of FIGS. 7-10. The movement of the lift pedal 42 in the direction of the first arrow A1 can cause the first lift lever 46 to pivot about the first axis 99 and cause the linkage assembly 70 to raise the deck 14 from the operating elevation OE and toward the stowed elevation SE.

As the lift pedal 42 pivots through the stroke, the lock striker 48 can abut the contact surface 67 of the deck lock 60 and cause the deck lock 60 to pivot from the unlocked position of FIG. 7 toward an unlocked position shown in FIG. 12. Then, the lock striker 48 can slide along the contact surface 67 as the elongated portion 61 passes between the unlock pedal 52 and the lock striker 48. The concavity of the second curved surface 177 can permit the lock striker 48 to abut against and displace the elongate portion 61 toward the second curved surface 177 without the deck lock 60 interfering with the movement of either the lock striker 48 or the unlock pedal 52. As the lift pedal 42 moves into the full stroke position, the lower end of the elongated portion 61 can be displaced onto an upper portion of the lock striker 48, similar to the position shown in FIG. 12.

In the full stroke position of the lift pedal 42 shown in FIG. 10, the lock striker 48 can move beyond the elongated portion 61 of the deck lock 60 and can enter the slot 68. As shown in FIG. 8, the deck lock 60 can pivot toward the locked position by moving in the direction of the second arrow A2 while the operator holds the lift pedal 42 in the full stroke position of FIG. 10.

The slot 68 can include an end surface 69. The end surface 69 can be spaced away from the lock striker 48 in a counterclockwise direction, as viewed in FIG. 10, when the lift pedal 42 is in the full stroke position. When the operator releases the lift lever 42 from the full stroke position of FIG. 10, the weight of the deck 14 can pivot the lift lever 42 in the direction opposite to the first arrow A1 so that the lock striker 48 abuts the end 69 of the slot 68. In the frame of reference of FIGS. 7-10, the weight of the deck 14 can pivot the lift lever 42 in a clockwise direction so that the lock striker 48 moves away from the lock attachment 62. As a result, the deck lock 60 can placed in tension by the lock attachment 62 and the lock striker 48. Thus, the slot 68 can maintain engagement with the lock striker without any further structure or action by the operator.

FIGS. 9-13 depict the storage lock assembly 40 moving from a locked position of the lift pedal 42 and the deck lock 60 to the operation position of the lift pedal 60 and the unlocked position of the deck lock 60. FIG. 9 shows the deck lock 60 in the locked position and the lift lever 42 in the stowed position. FIG. 10 shows the lift pedal 42 in the full stroke position and the deck lock 60 in the locked position.

Figure 11:
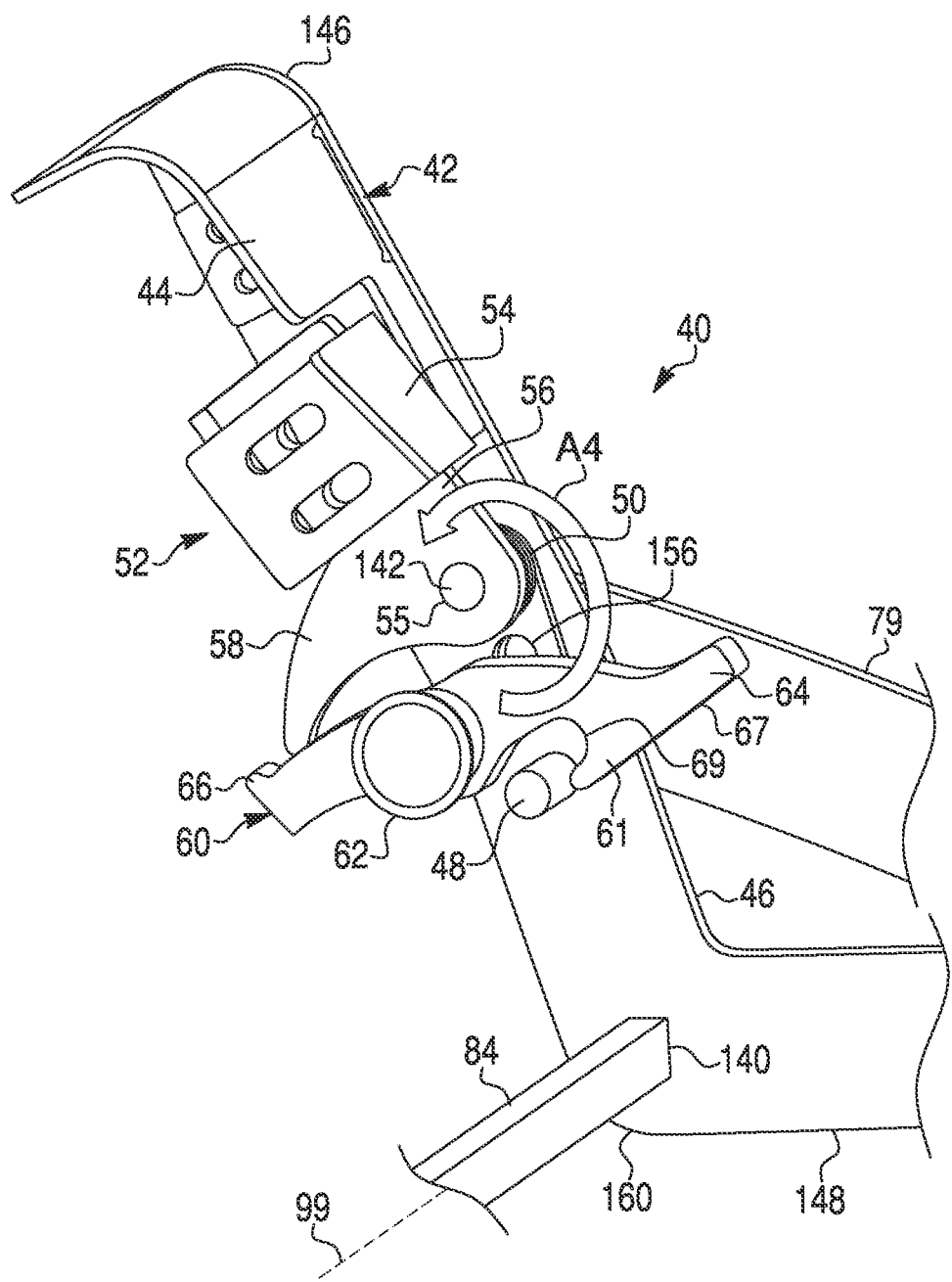
FIG. 11 is a perspective view of the storage lock assembly of FIG. 5 and shows a secondary pedal moving the deck lock away from the locked position and toward the unlocked position.
Figure 13:
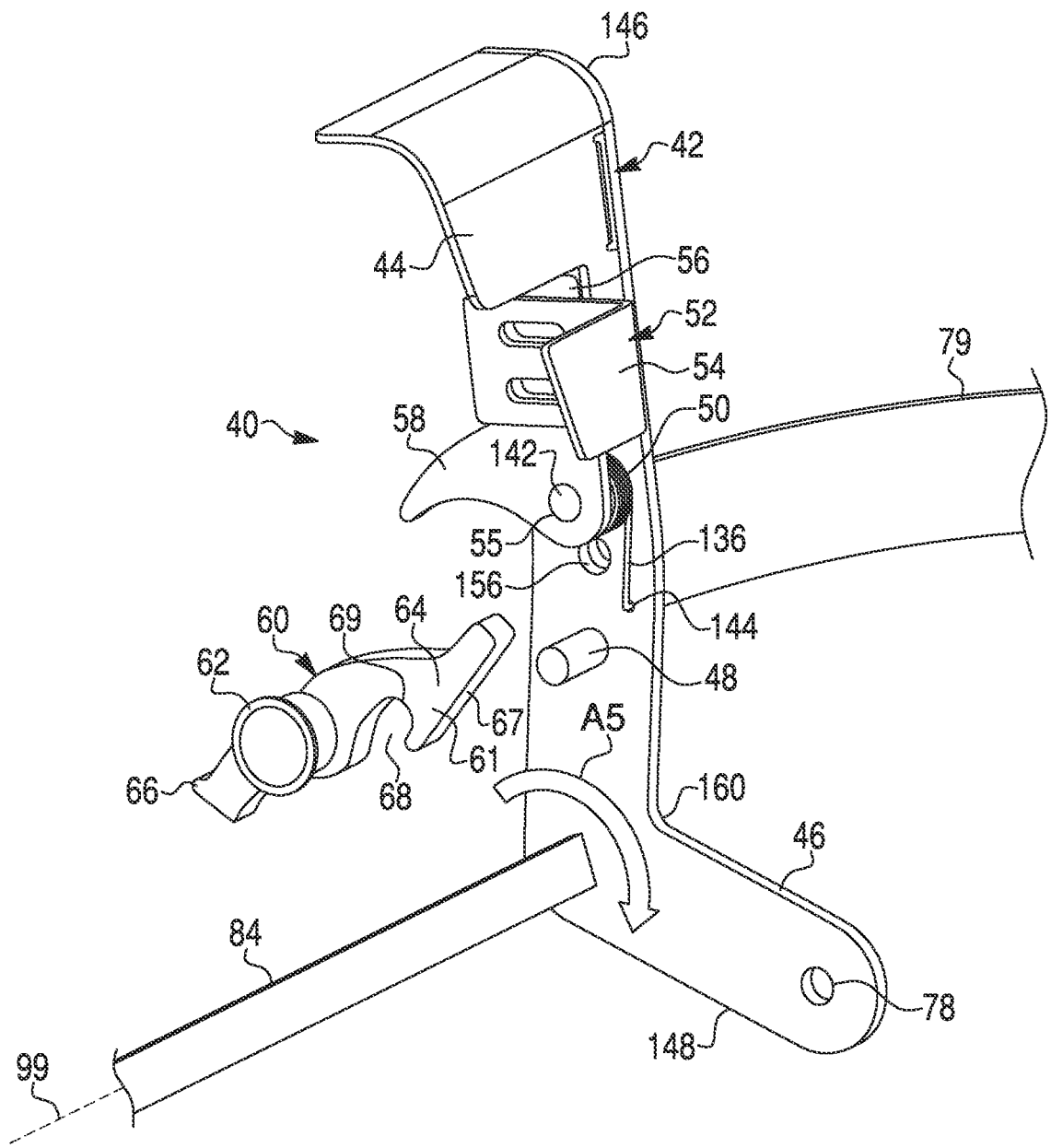
FIG. 13 is a perspective view of the storage lock assembly of FIG. 5 and shows the deck lock in the unlocked position and the primary pedal moving into an operating position.

FIG. 11 shows the lift pedal 42 in the full stroke position and the deck lock 60 in an initial released position. FIG. 12 shows the lift pedal 42 in the full stroke position and the deck lock 60 in initially unlocked position. FIG. 13 shows the deck lock 60 in the unlocked position and the lift pedal 42 in one of the operating positions.

Referring to FIG. 10, the operator can push the lift pedal 42 to the full stroke position to pivot the first lift lever 46 about the first axis 99 in the counterclockwise direction as viewed in FIG. 10 and indicated by the third arrow A3. This movement of the lift pedal 42 can cause the lock striker 48 to move away from the end 69 of the slot 68 so at least a portion of the lock striker 48 is spaced forward of the lower end of the elongated portion 61 with respect to the longitudinal direction L of the lawnmower 10

Referring to FIGS. 11 and 12, while the operator maintains the lift pedal 42 in the full stroke position, the operator can press the unlock pedal 52 with the heel of their foot to actuate the unlock pedal 52 and move the unlock pedal from the first position shown in FIG. 10 to the second position shown in FIG. 12. The unlock pedal 52 can pivot relative to the lift pedal 42 in the direction of the fourth arrow A4 and the extension 58 can push down on the deck lock 60 to move the deck lock 60 into the initial release position shown in FIG. 11, into the initially unlocked position shown in FIG. 12, and ultimately into the unlocked position shown in FIG. 11. The engagement member 58 can cause the deck lock 60 to pivot counterclockwise in the frame of reference of FIGS. 5-13 so that the lock striker 48 disengages from the slot 68.

Referring to FIG. 12, the engagement member 58 can continue to ride, or slide, along the surface of the deck lock 60 as the operator returns the lift pedal 42 back through the stroke toward the operating position, while maintaining the unlock pedal 52 in the second position. This operation can ensure that the deck lock 60 does not re-enter the slot 68 so that the lift pedal 42 can move into the operating position.

Referring to FIG. 13, when the lock striker 48 clears the deck lock 60, the operator can release the lift lever 42 so that the lift lever 42 pivots about the first axis 99 in the direction of the fifth arrow A5. The lift lever 42 can then pivot into the operation position and the deck 14 can be placed at the desired operation elevation OE.

The storage lock assembly 40 of the presently disclosed subject matter can provide a hands-free operation to raise, lock, unlock, and lower the deck 14 of a lawn mower 10. An operator can maintain hold of the pair of control levers 22 to enable steering and driving of the lawn mower 10 while simultaneously raising or lowering the cutting deck 14 by selectively operating the lift pedal 42 and unlock pedal 52. Thus, the storage lock assembly 40 can encourage a positive perception of the lawn mower 10 by the operator.

While certain embodiments of the presently disclosed subject matter are described above, it should be understood that the presently disclosed subject matter can be embodied and configured in many different ways without departing from the spirit and scope of the presently disclosed subject matter.

In an exemplary embodiment shown in FIGS. 5 and 6, the deck lock 60 is mounted on the frame 12 and the lock striker 48 is protruding from the lift pedal 42. In another embodiment, the deck lock 60 can be mounted on the lift pedal 42 and the lock striker 48 can protrude from the frame 12 in a transverse direction of the lawn mower 10.

Embodiments of the lock striker 48 are discussed above in the context of a cylindrical peg. However, embodiments are intended to include or otherwise cover any type of appropriate lock striker including, but not limited to, a peg, a u-shaped clip, or striker post.

The primary pad 44 and the secondary pad 54 can include covers that facilitate actuation of the lift pedal 42 and the unlock pedal 52, respectively. For example, a rubber pad can slide over the lift pedal 42 or the unlock pedal 52 to increase the grip forces between an operator's footwear and either of the pedals.

Although in an exemplary embodiment, the pedal spring 50 can be described as a torsional spring, it can also be any other spring known in art sufficient to exert a torque bias against the unlock pedal 52.

Embodiments of the deck 14 are disclosed above in the context of a cutting deck including at least one rotatable blade housed therein. However, embodiments are intended to include or otherwise cover any type of deck or lawn mower attachment structure that can be raised and/or lowered depending on the cutting surface. Example of other decks can include, but are not limited to, mulching decks, mower decks, tillage equipment, cutters, shredders, and any other type of raiseable accessory for use with an appropriate lawn mower or lawn tractor.

Embodiments of the storage lock assembly 40 are disclosed above in the context of being disposed on a right side of the lawn mower 10. In alternate exemplary embodiments the storage lock assembly 40 can be located on the left side of the lawn mower 10. Exemplary embodiments can include a lift pedal and unlock pedal disposed between the pair of longitudinal frame members 90, 91 on an inside of the lawn mower 10.

Embodiments are disclosed above in the context of a zero-turn radius lawn mower. However, embodiments are intended to cover other self-propelled lawn mowers including lawn mowers configured for the user to walk behind the lawn mower, ride on the lawn mower, or ride on a sulky trailered to the lawn mower. Embodiments are intended to cover any garden-type lawn mower or lawn tractors.

Self-propelled lawn mowers can include different types of propulsion systems such as but not limited to an internal combustion engine or all electric ZTR mowers that drive a geared transmission directly connected to the engine or connected by a belt and pulleys, or drives a continuously variable transmission that uses a belt and adjustable pulleys, or drives a hydrostatic transmission. The propulsion apparatus can drive one of the wheels, or more than one of the wheels of the lawn mower.

Exemplary embodiments of a ride-on lawn mower can include a hydrostatic transmission (HST) or drive motors. The lawn mower with steerable wheels can include a single HST that drives at least one wheel. The ZTR lawn mower can include a pair of HST's or drive motors, one for each drive wheel. Each HST or drive motor can include an input pulley that is driven by a belt that is driven by an output pulley connected to a source of torque such as an internal combustion engine, electric motor, hybrid motor or other known power source. The source of torque can also be referred to as a power source.

Exemplary embodiments are disclosed above that can pivot in clockwise or counterclockwise directions from the perspective of the view shown of exemplary embodiments of figures. However, embodiments are intended to include or otherwise cover pivotable movement from one position to another position. That is, any of the above disclosed embodiments can cover movement between multiple positions and are not limited by directions relative to the view of the figures.

Exemplary embodiments are disclosed above that can include pivotable movement. However, embodiments are intended to include or otherwise cover other movements such as but not limited to sliding, rotating, and any appropriate movement that can be used in linkages.

Exemplary embodiments are disclosed above that can include a plurality of blade assemblies 36 and a plurality of cutting chambers 34. However, embodiments are intended to include or otherwise cover a single blade assembly and a single cutting chamber.

Embodiments are disclosed above that can include control levers 22L, 22R. However, embodiments are intended to include or otherwise cover any type of lever that can be movably connected to the frame 12 and pivotable in a direction of an input force applied by an operator to control a drive direction and a steering direction of the lawn mower 10. These embodiments can include, but are not limited to, joysticks, single control levers, control knobs, switches, buttons, or control interfaces.

Any of the fasteners disclosed herein can be replaced with other known attachment structures such as rivets, welds, adhesives, clamps, etc.

Any of the structure described herein as pivotable can also be designed as rotatable. One of ordinary skill in the art will recognize that elements that are pivotable about a respective axis may also be described as rotatable about the axis in configurations where the axis is centered within the element. As used herein, pivoting independently of can refer to pivoting without input from another element, pivoting about a different axis, and/or pivoting at a different rate of speed than another element.

What is claimed is:

1. A storage lock assembly for a lawn mower having a frame and a deck suspended from the frame, the deck is adjustable between a stowed position and at least one operating position, the lock assembly comprising:
   a primary pedal movably mounted on the frame and connected to the deck to move the deck between the operating position and the stowed position;
   a lock striker mounted on and protruding from the primary pedal in a transverse direction of the lawn mower;
   a secondary pedal pivotably attached to the primary pedal, the secondary pedal includes an engagement member; and
   a deck lock mounted on the frame and movable between,
      a locked position where the deck is in the stowed position and the deck lock is engaged with the lock striker, and
      an unlocked position where the deck lock is disengaged from the lock striker and the deck is lowered from the stowed position to the operating position, wherein
   when the deck lock is in the locked position and the secondary pedal pivots relative to the primary pedal, the engagement member moves the deck lock away from the lock striker and to the unlocked position.

2. The storage lock assembly of claim 1, wherein
   the primary pedal includes a primary pad, a lift lever attached to the primary pad, and a pivot shaft, the lift lever is connected to the deck such that movement of the lift lever moves the deck relative to the frame between the stowed position and the operating position,
   the secondary pedal includes a secondary pad and a main body attached to the secondary pad, the main body includes a mounting plate, a pivot hole, and the engagement member, and
   the pivot shaft extends into the pivot hole.

3. The storage lock assembly of claim 2, further comprising:
   a pedal spring disposed between the primary pedal and the engagement member.

4. The storage lock assembly of claim 3, wherein
   the secondary pedal is movable between a first position where the engagement member permits the deck lock to move to the locked position and a second position where the engagement member has pushed the deck lock to the unlocked position, and
   the pedal spring biases the secondary pedal toward the first position.

5. The storage lock assembly of claim 1, wherein
   the lock striker is a cylindrical peg and the deck lock includes a slot, and the deck lock is in the locked position when the lock striker abuts the slot.

6. The storage lock assembly of claim 5, wherein
   the primary pedal pivots between a full stroke position, a locked pedal position, and an operating pedal position, the locked pedal position is located between the full stroke position and the operating position, the peg is located in the slot and spaced away from the deck lock when the primary pedal is in the full stroke position, the peg is located in the slot and abuts the deck lock when the primary pedal is in the locked pedal position, and the deck is in the operating position when the pedal is in the pedal operating position,
   the secondary pedal pivots between a first position and a second position, the secondary pedal is biased into the first position,
   the engagement member pushes the deck lock to disengage the slot from the peg when the deck lock is in the locked position, the primary pedal is in the full stroke position, and the secondary pedal is actuated from the first position to the second position, and
   the deck lock abuts the lock striker causing the deck lock to pivot away from the lock striker such that the slot engages the lock striker when the primary pedal is actuated from the operation position to the full stroke position and then to the locked pedal position.

7. The storage lock assembly of claim 1, wherein the primary pedal pivots about a first axis and the deck lock pivots about a second axis that is different from the first axis.

8. The storage lock assembly of claim 1, wherein
   the primary pedal pivots about a first axis, the secondary pedal pivots about a second axis that is different from the first axis, and the deck lock pivots about a third axis that is different from the first axis and the second axis.

9. The storage lock assembly of claim 1, wherein the engagement member includes two curved sides that converge at an end.

10. The storage lock assembly of claim 9, wherein at least one of the two curved sides of the engagement member is concave and spaced away from the deck lock when the end of the engagement member contacts the deck lock.

11. A lawn mower, comprising:
   a main frame;
   a deck including a cutting chamber;
   a blade rotatably supported in the cutting chamber;
   a power source attached to the main frame and rotatably driving the blade;
   a plurality of wheels connected to the main frame;
   a linkage assembly movably connecting the deck to the main frame such that the deck is movable relative to the main frame between a stowed position and at least one operating position that is lower in elevation with respect the stowed position in a vertical direction of the lawn mower;

a primary pedal movably mounted on the frame and connected to the linkage assembly to move the deck between the operating position and the stowed position;

a lock striker mounted on and protruding from the primary pedal in a transverse direction of the lawn mower;

a secondary pedal pivotably attached to the primary pedal, the secondary pedal includes an engagement member; and a deck lock mounted on the frame and movable between,
   a locked position where the deck is in the stowed position and the deck lock is engaged with the lock striker, and
   an unlocked position where the deck lock is disengaged from the lock striker and the deck is lowered from the stowed position and the operating position, wherein when the deck lock is in the locked position and the secondary pedal pivots relative to the primary pedal, the engagement member moves the deck lock away from the lock striker and to the unlocked position.

12. The lawn mower of claim 11, wherein
the primary pedal includes a primary pad, a lift lever attached to the primary pad, and a pivot shaft, the lift lever is connected to the deck such that movement of the lift lever moves the deck relative to the frame,
the secondary pedal includes a secondary pad and a main body attached to the secondary pad, the main body includes a mounting plate, a pivot hole, and the engagement member, and
the pivot shaft extends into the pivot hole.

13. The lawn mower of claim 12, wherein
the linkage assembly further includes
   a second lift lever movably mounted to the main frame and connected to the deck,
   a first linkage connecting the first lift lever and the second lift lever,
   a third lift lever movably mounted to the main frame and connected to the deck,
   a fourth lift lever movably mounted to the main frame and connected to the deck,
   a second linkage connecting the third lift lever to the fourth lift lever,
   a first transverse linkage connecting the first lift lever to the third lift lever, and
   a second transverse linkage connecting the second lift lever to the fourth lift lever, wherein
actuation of the primary pedal pivots the first lift lever, the second lift lever, the third lift lever, and the fourth lift lever in unison.

14. The lawn mower of claim 13, wherein
the primary pedal is disposed between the main frame and the first linkage in a transverse direction of the lawnmower.

15. A zero-turn-radius lawn mower, comprising:
a frame;
a deck including a cutting chamber;
a linkage assembly movably connecting the deck to the main frame such that the deck is movable relative to the main frame between a stowed position and at least one operating position that is lower in elevation with respect a vertical direction of the lawn mower as compared to the stowed position;
a power source mounted on the frame;

a pair of drive wheels selectively and independently driven by the power source;

at least one blade rotatably supported in the cutting chamber and rotationally driven by the power source;

at least one control lever movably connected to the frame such that movement of the lever causes the drive assembly to drive the drives wheels in a selected one of a forward direction, a reverse direction and a turning direction; and a storage lock assembly including,
   a primary pedal movably mounted on the frame and connected to the linkage assembly to move the deck between the operating position and the stowed position,
   a lock striker protruding from one of the primary pedal and the frame in a transverse direction of the lawn mower,
   a deck lock mounted on another one of the primary pedal and the frame, the deck lock is movable between a locked position where the deck lock is engaged with the lock striker and an unlocked position where the deck lock is disengaged from the lock striker,
   a secondary pedal pivotably attached to the primary pedal, the secondary pedal including an engagement member, and
   a pedal spring disposed between the primary pedal and the engagement member, the pedal spring biases the second pedal is a direction away from the deck lock, wherein
when the deck lock is in the locked position and the secondary pedal pivots relative to the primary pedal, the engagement member moves the deck lock away from the lock striker and to the unlocked position.

16. The zero-turn-radius lawn mower of claim 15, further comprising:
a seat mounted on the frame; and
a foot plate, wherein
the frame includes a pair of longitudinal frame members spaced apart from each other,
the foot plate is mounted on the pair of longitudinal frame members at a located adjacent to the seat and spans a space between the longitudinal frame members,
the storage lock assembly is disposed outside of the pair of longitudinal members, and
the at least one lever includes a pair of control handles connected to and extending away from the frame.

17. The zero-turn-radius lawn mower of claim 16, wherein
the deck lock is pivotably mounted on one of the pair of longitudinal frame members, and
the primary pedal is pivotally mounted on the one of the pair of longitudinal members.

18. The zero-turn-radius lawn mower of claim 15, wherein
the engagement member includes a first straight side, a second straight side parallel to and spaced away from the first straight side, a first curved surface extending away from the first straight side, a second curved side extending from the extending from the second straight side and converging toward the first straight side to form a contact end, and
the contact end abuts the deck lock when the secondary pedal is in the second position while engagement member moves the deck lock from the locked position to the unlocked position.

19. The zero-turn-radius lawn mower of claim 15, wherein
the deck lock pivots relative to the primary pedal.

20. The zero-turn-radius lawn mower of claim 15, wherein
each of the deck lock and the secondary pedal pivots relative to the primary pedal when the secondary pedal is actuated.

* * * * *